(12) United States Patent
Vassberg et al.

(10) Patent No.: US 11,053,888 B2
(45) Date of Patent: Jul. 6, 2021

(54) FAN COWL WITH A SERRATED TRAILING EDGE PROVIDING ATTACHED FLOW IN REVERSE THRUST MODE

(71) Applicant: The Boeing Company, Chicago, IL (US)

(72) Inventors: John C. Vassberg, Long Beach, CA (US); Mark DeHaan, Rancho Palos Verdes, CA (US); Dino Roman, Lake Forrest, CA (US)

(73) Assignee: The Boeing Company, Chicago, IL (US)

( * ) Notice: Subject to any disclaimer, the term of this patent is extended or adjusted under 35 U.S.C. 154(b) by 543 days.

(21) Appl. No.: 15/801,105

(22) Filed: Nov. 1, 2017

(65) Prior Publication Data
US 2019/0128214 A1 May 2, 2019

(51) Int. Cl.
| | |
|---|---|
| *F02K 1/66* | (2006.01) |
| *F04D 29/52* | (2006.01) |
| *F04D 29/36* | (2006.01) |
| *F02K 1/46* | (2006.01) |
| *F02K 1/48* | (2006.01) |

(Continued)

(52) U.S. Cl.
CPC ............... *F02K 1/66* (2013.01); *F02K 1/46* (2013.01); *F02K 1/48* (2013.01); *F04D 29/362* (2013.01); *F04D 29/522* (2013.01); *F01D 25/24* (2013.01); *F02C 3/04* (2013.01); *F05D 2220/323* (2013.01); *F05D 2240/12* (2013.01); *F05D 2250/16* (2013.01); *F05D 2250/184* (2013.01); *F05D 2250/61* (2013.01)

(58) Field of Classification Search
CPC ...... F02K 1/64; F02K 1/66; F02K 1/46; F02K 1/56; F02K 1/54; F02K 1/48; F05D 2240/12; B64D 29/06; B64D 29/00; B64C 7/02
See application file for complete search history.

(56) References Cited

U.S. PATENT DOCUMENTS

| | | | | |
|---|---|---|---|---|
| 5,169,288 A | * | 12/1992 | Gliebe | .................... F02C 7/045 |
| | | | | 415/119 |
| 6,360,528 B1 | * | 3/2002 | Brausch | .................... F02K 1/46 |
| | | | | 181/220 |

(Continued)

FOREIGN PATENT DOCUMENTS

| | | |
|---|---|---|
| CN | 1644904 A | 7/2005 |
| CN | 101263295 A | 9/2008 |

(Continued)

OTHER PUBLICATIONS

Andreas Peters, Ultra-Short Nacelles for Low Fan Pressure Ratio Propulsors, Massachusetts Institute of Technology, Feb. 2014; pp. 3, 129-133, 140-145. (Year: 2014).*

*Primary Examiner* — Gerald L Sung
*Assistant Examiner* — Alyson Joan Harrington
(74) *Attorney, Agent, or Firm* — Felix L. Fischer

(57) ABSTRACT

An ultrashort nacelle configuration employs a fan cowl having an exit plane and a serrated trailing edge. A variable pitch fan is housed within the fan cowl. The variable pitch fan has a reverse thrust position inducing a reverse flow through the exit plane and into the fan cowl. The serrated trailing edge forms a plurality of vortex generators configured to induce vortices in the reverse flow.

21 Claims, 17 Drawing Sheets

(51) Int. Cl.
*F02C 3/04* (2006.01)
*F01D 25/24* (2006.01)

(56) References Cited

U.S. PATENT DOCUMENTS

| | | | | |
|---|---|---|---|---|
| 7,578,132 | B2 * | 8/2009 | Webster | F02K 1/383 60/226.1 |
| 10,443,412 | B2 * | 10/2019 | Niergarth | B64C 11/44 |
| 2002/0178711 | A1 * | 12/2002 | Martens | F02K 1/386 60/226.1 |
| 2006/0010853 | A1 * | 1/2006 | Goutines | F02K 1/386 60/262 |
| 2006/0101807 | A1 * | 5/2006 | Wood | B64C 7/02 60/262 |
| 2008/0272228 | A1 * | 11/2008 | Mengle | B64D 33/06 244/54 |
| 2010/0115958 | A1 | 5/2010 | Parham | |
| 2016/0052621 | A1 * | 2/2016 | Ireland | B64C 21/04 137/13 |
| 2016/0146113 | A1 * | 5/2016 | Zatorski | F01D 7/00 415/151 |
| 2016/0363050 | A1 * | 12/2016 | Joshi | F01D 7/00 |
| 2016/0369639 | A1 * | 12/2016 | Goerig | F02K 1/66 |
| 2017/0058683 | A1 * | 3/2017 | Niergarth | F01D 7/00 |
| 2017/0218975 | A1 * | 8/2017 | Bintz | F02K 1/72 |

FOREIGN PATENT DOCUMENTS

| | | | | |
|---|---|---|---|---|
| CN | 104196649 | A | 12/2014 | |
| CN | 204253209 | U | 4/2015 | |
| CN | 105626310 | A | 6/2016 | |
| EP | 3187712 | A1 | 7/2017 | |
| GB | 2289921 | A * | 12/1995 | F02K 1/386 |
| WO | 2014114988 | A1 | 7/2014 | |

\* cited by examiner

FAN COWL WITH A SERRATED TRAILING EDGE PROVIDING ATTACHED FLOW IN REVERSE THRUST MODE

BACKGROUND INFORMATION

Field

Implementations shown in the disclosure relate generally to fan cowls for turbofan aircraft engines and more particularly to implementations for fan cowls with a serrated trailing edge employed in ultrashort nacelles with variable pitch fans having reverse thrust capability.

Background

Large high bypass turbofan engines are employing ultrashort nacelles. Variable pitch fans with reverse thrust capability are being introduced into such turbofan engines and control of airflow in the fan cowl of an ultrashort nacelle is becoming increasingly important. In reverse thrust mode, particularly on initial activation when the aircraft is at a relatively high airspeed, incoming flow being drawn around the trailing edge to enter through the exit plane of the fan cowl must undergo significant turning and resulting flow separation from the internal surface of the fan cowl can be significant. With long fan cowls, the flow has some ability to reattach before reaching the fan. However, with ultrashort nacelles, the length of the fan cowl may be insufficient to provide reattachment and aerodynamic qualities of the reverse thrust produced by the fan may be reduced. A variable geometry nozzle (VAN) can be used to help alleviate the flow separation in reverse thrust mode. However, VANs are structurally and mechanically complex, may be expensive to manufacture, create weight penalties, and may require extensive maintenance.

SUMMARY

Exemplary implementations provide an ultrashort nacelle configuration employing a fan cowl having an exit plane and a serrated trailing edge. A variable pitch fan is housed within the fan cowl. The variable pitch fan has a reverse thrust position inducing a reverse flow through the exit plane and into the fan cowl. The serrated trailing edge forms a plurality of vortex generators configured to induce vortices in the reverse flow.

The exemplary implementations allow a method for controlling airflow for reverse thrust in an ultrashort nacelle. A reverse flow through an exit plane of a fan cowl is induced with a variable pitch fan housed within the fan cowl and having a reverse thrust position. The reverse flow is drawn across a serrated trailing edge of the fan cowl. Vortices in the reverse flow are induced with a plurality of periodic curves forming the serrated trailing edge.

BRIEF DESCRIPTION OF THE DRAWINGS

The features, functions, and advantages that have been discussed can be achieved independently in various implementations of the present disclosure or may be combined in yet other implementations further details of which can be seen with reference to the following description and drawings.

DETAILED DESCRIPTION

The exemplary implementations described herein provide a fan cowl for use in an ultrashort nacelle for a turbofan engine employing a variable pitch fan (VPF) with reverse thrust capability. The fan cowl employs a serrated trailing edge (STE) with the periodic curves of the serrations acting as vortex generators (VGs) when the airflow is being drawn in from the exit plane around the trailing edge during reverse thrust (RT) operation. Without these VGs, the incoming flow would otherwise separate and greatly reduce the RT capability of the system. In normal operation, such as cruise, climb, take-off and landing, the STE-VGs are essentially inactive thereby minimizing aerodynamic losses and impact on specific fuel consumption.

Figure 1A:
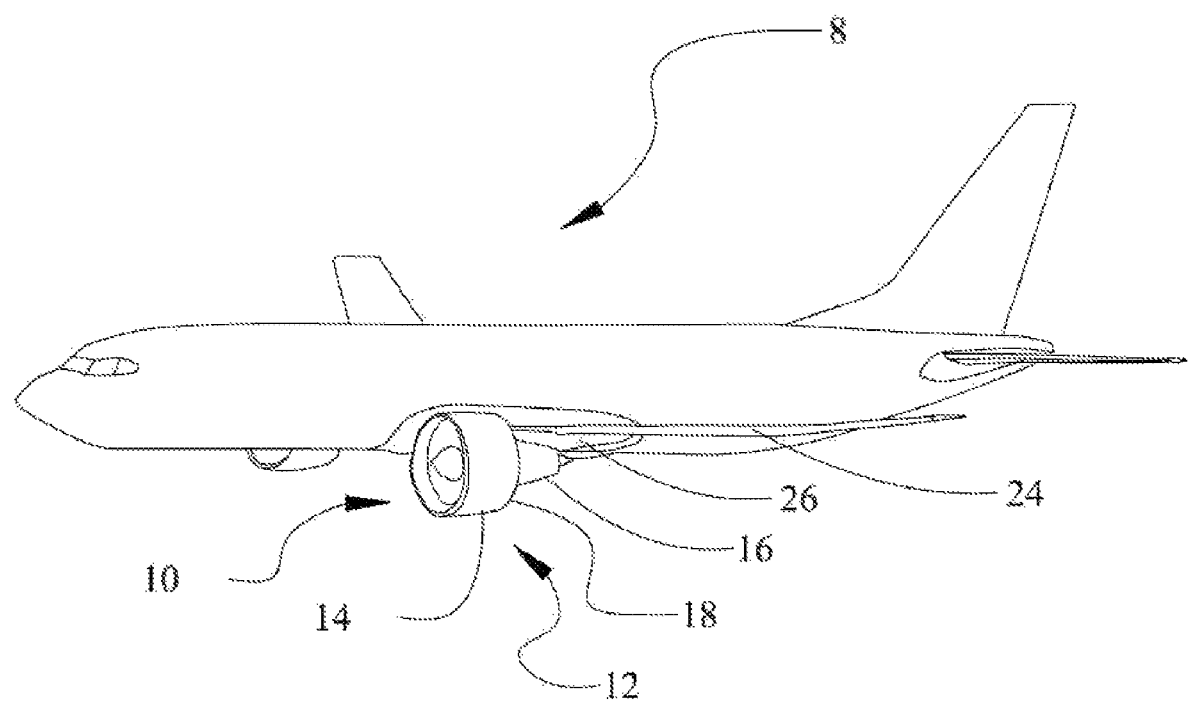
FIGS. 1A and 1B are pictorial representations of a general configuration of a high bypass turbofan engine.
Figure 1B:
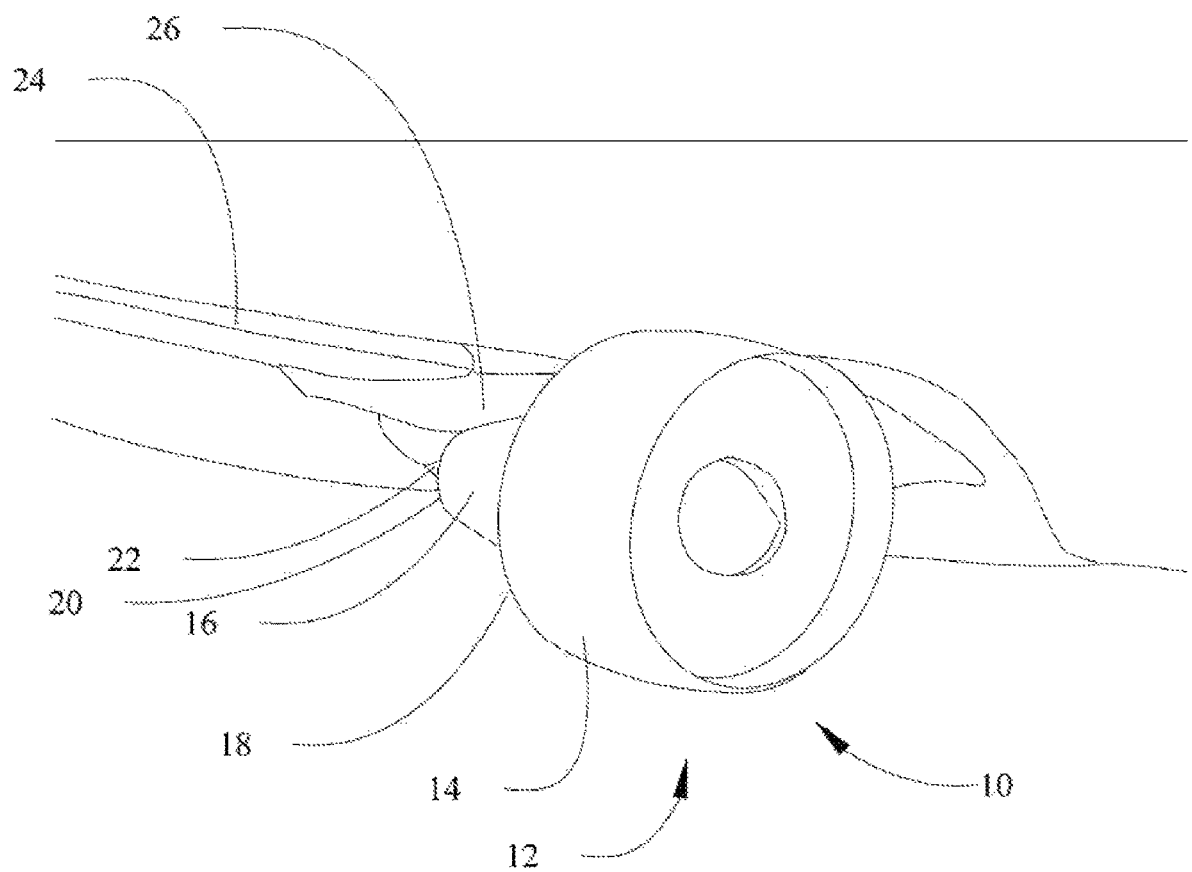

Referring to the drawings, FIGS. 1A and 1B show an aircraft 8 with a general configuration of an ultrahigh bypass turbofan engine 10 with a nacelle 12 having a fan cowl 14 and a core nacelle 16. In a conventional engine, the fan cowl 14 has a substantially planar trailing edge 18. The core nacelle 16 is substantially concentric with the fan cowl 14, typically extending aft of the trailing edge 18 and having an exhaust nozzle 20 for the engine core with a concentric tail cone 22. The nacelle 12 is typically suspended from an aircraft wing 24 with a pylon 26.

Figure 2A:
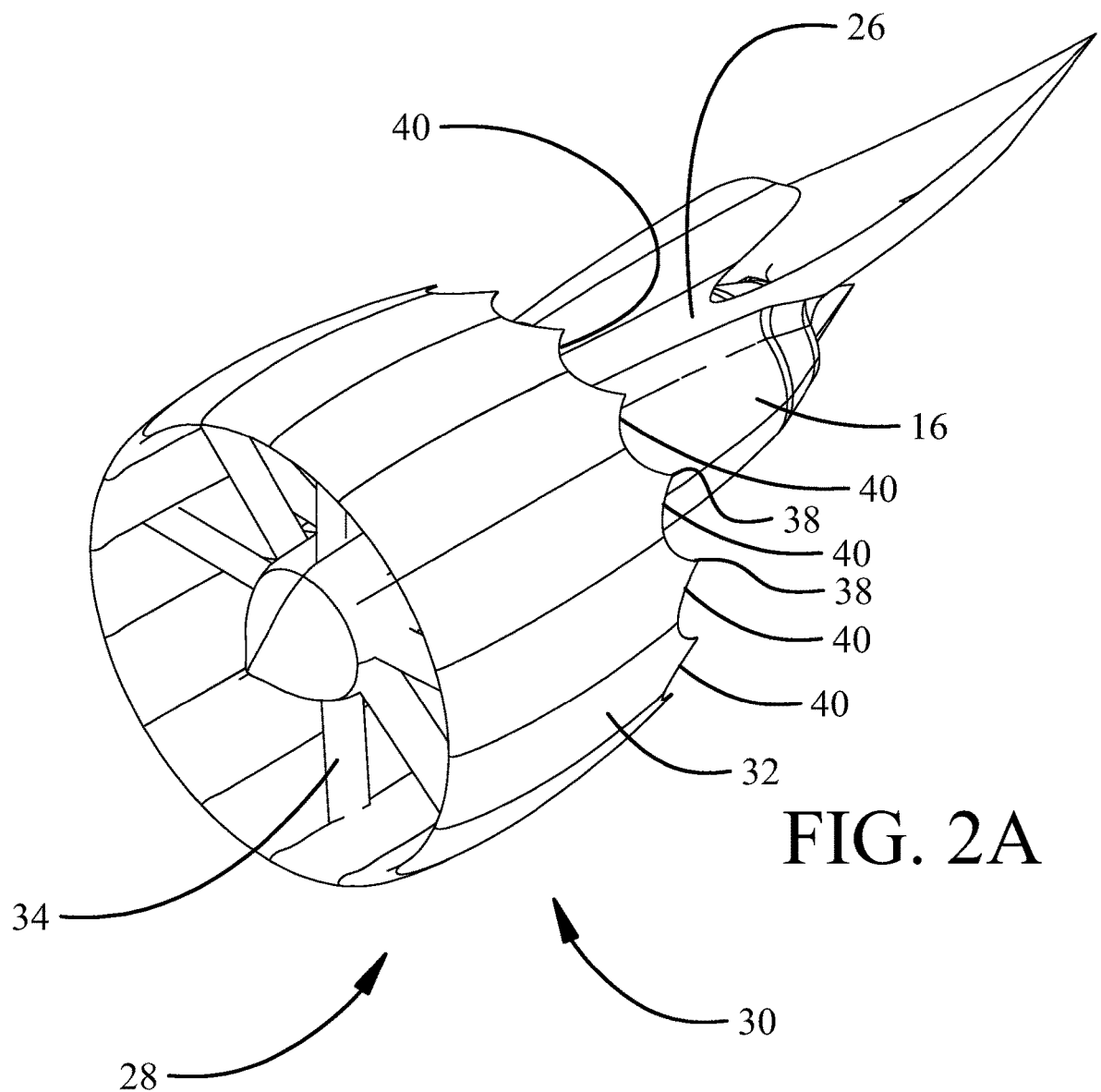
FIGS. 2A, 2B and 2C are a front pictorial representation, a side section representation and a rear pictorial representation of an exemplary implementation as described herein.
Figure 2B:
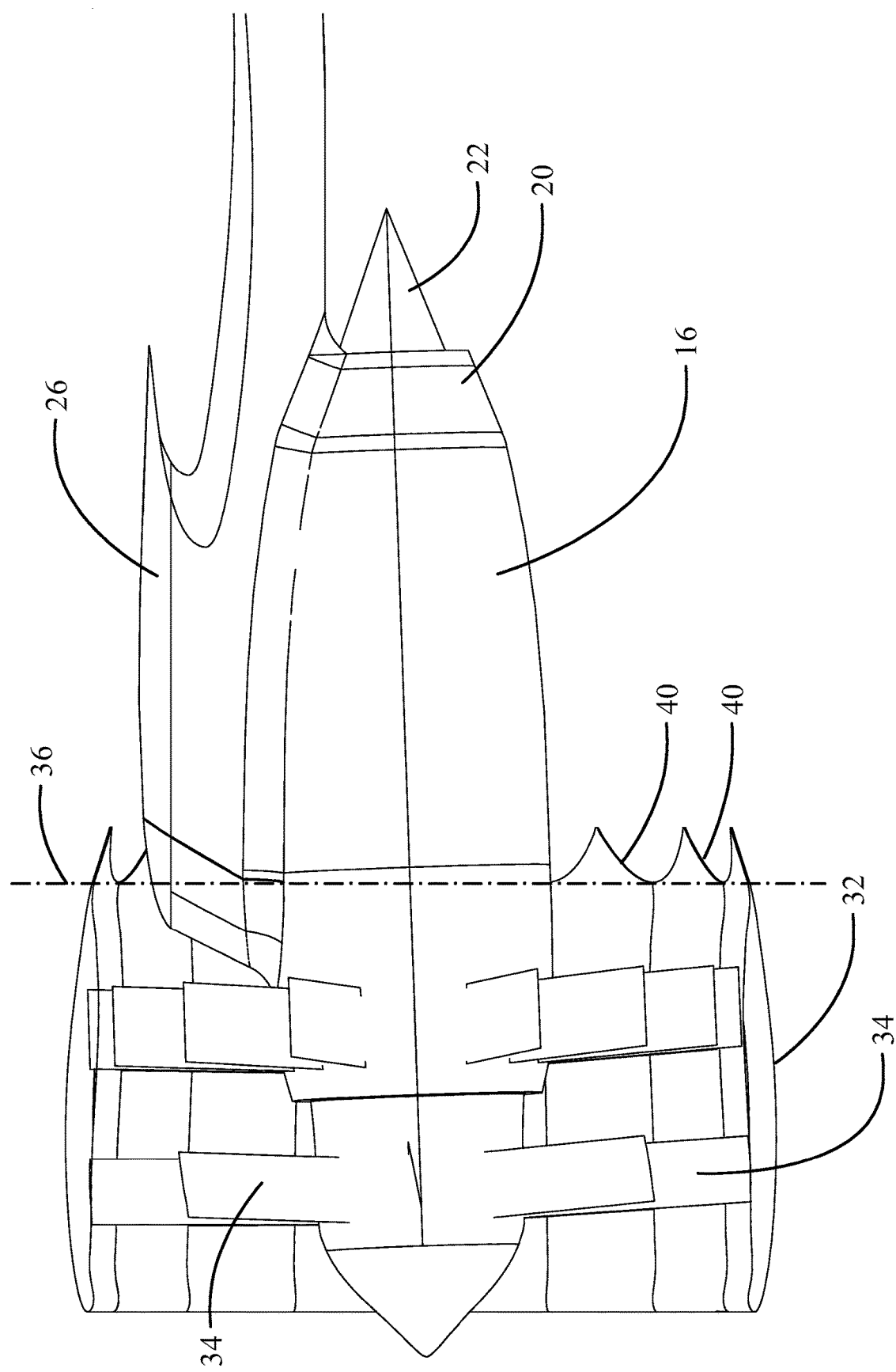
Figure 2C:
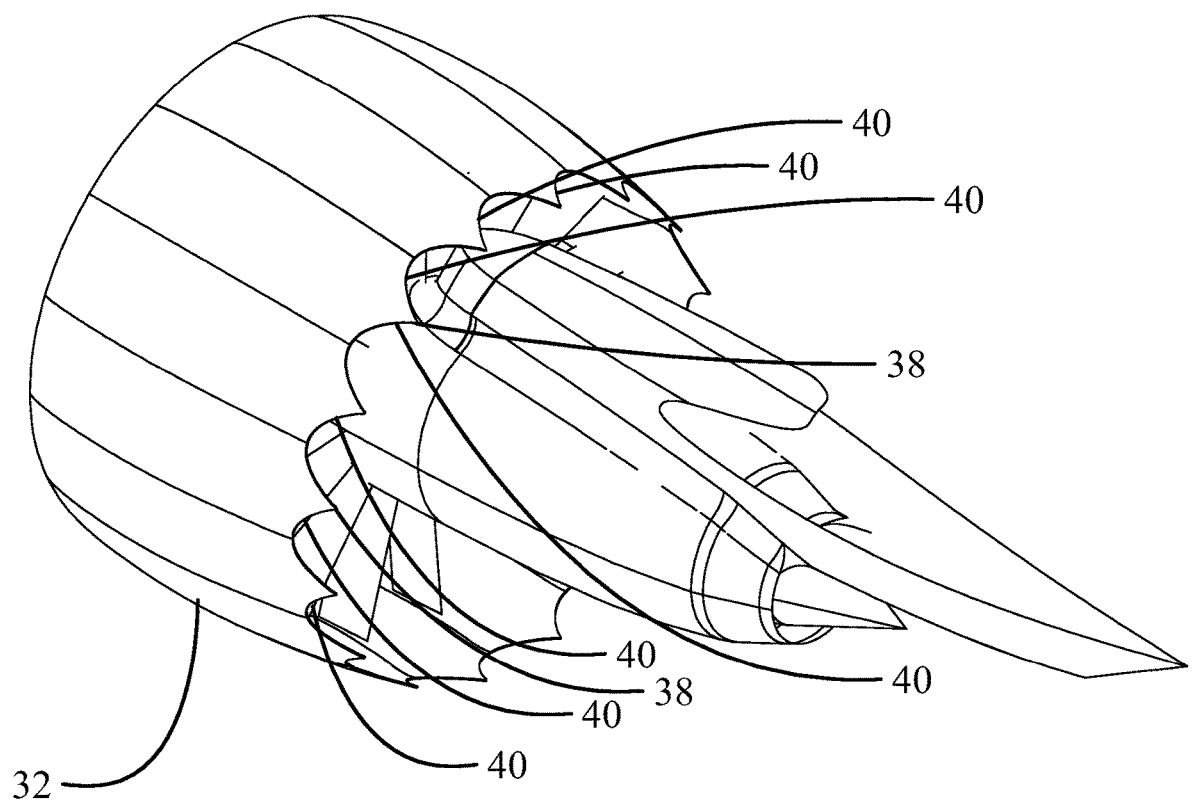

As seen in FIGS. 2A, 2B and 2C an exemplary implementation of an ultrahigh bypass turbofan engine 28 with an ultrashort nacelle 30 employs a fan cowl 32 housing a variable pitch fan (VPF) 34. The fan cowl 32 has an exit plane 36. In flight operations, takeoff, climb, cruise, descent and landing, airflow from the fan exits the fan cowl at the exit plane in an aft direction providing forward thrust for the aircraft. Upon landing, the VPF 34 may be placed into a reverse pitch providing a reverse thrust (RT) mode for the engine 28 to assist in decelerating the aircraft. In the RT condition, airflow is drawn through the exit plane 36 into the fan cowl 32 and advances forward through the VPF 34 rotating in reverse pitch. The fan cowl 32 has a serrated trailing edge 38. A plurality of periodic curves 40 extend around the circumference of the serrated trailing edge 38 to provide the serrations. Each of the periodic curves 40 acts as a vortex generator (VG) in the RT mode. The serrated trailing edge 38 provides entirely passive flow control without moving mechanisms or active alteration of geometry.

Figure 3:
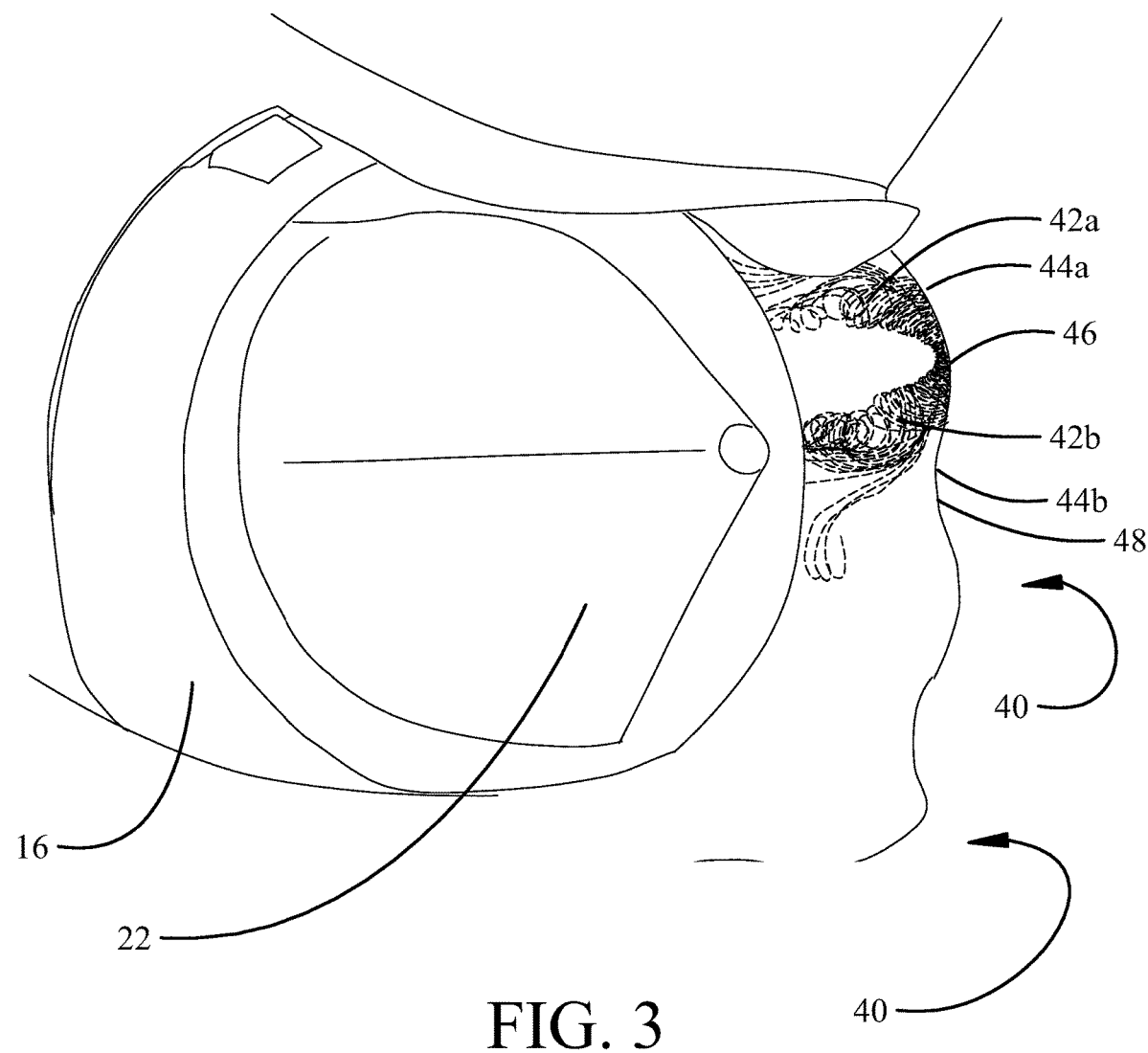
FIG. 3 is a generalized diagrammatic representation of the airflow in the exemplary implementation in reverse thrust mode.

FIG. 3 is a generalized diagrammatic representation of the airflow in RT mode demonstrating paired counter rotating vortices 42a, 42b created by the side profiles 44a and 44b of each periodic curve 40 from tip 46 to valley 48.

Figure 4A:
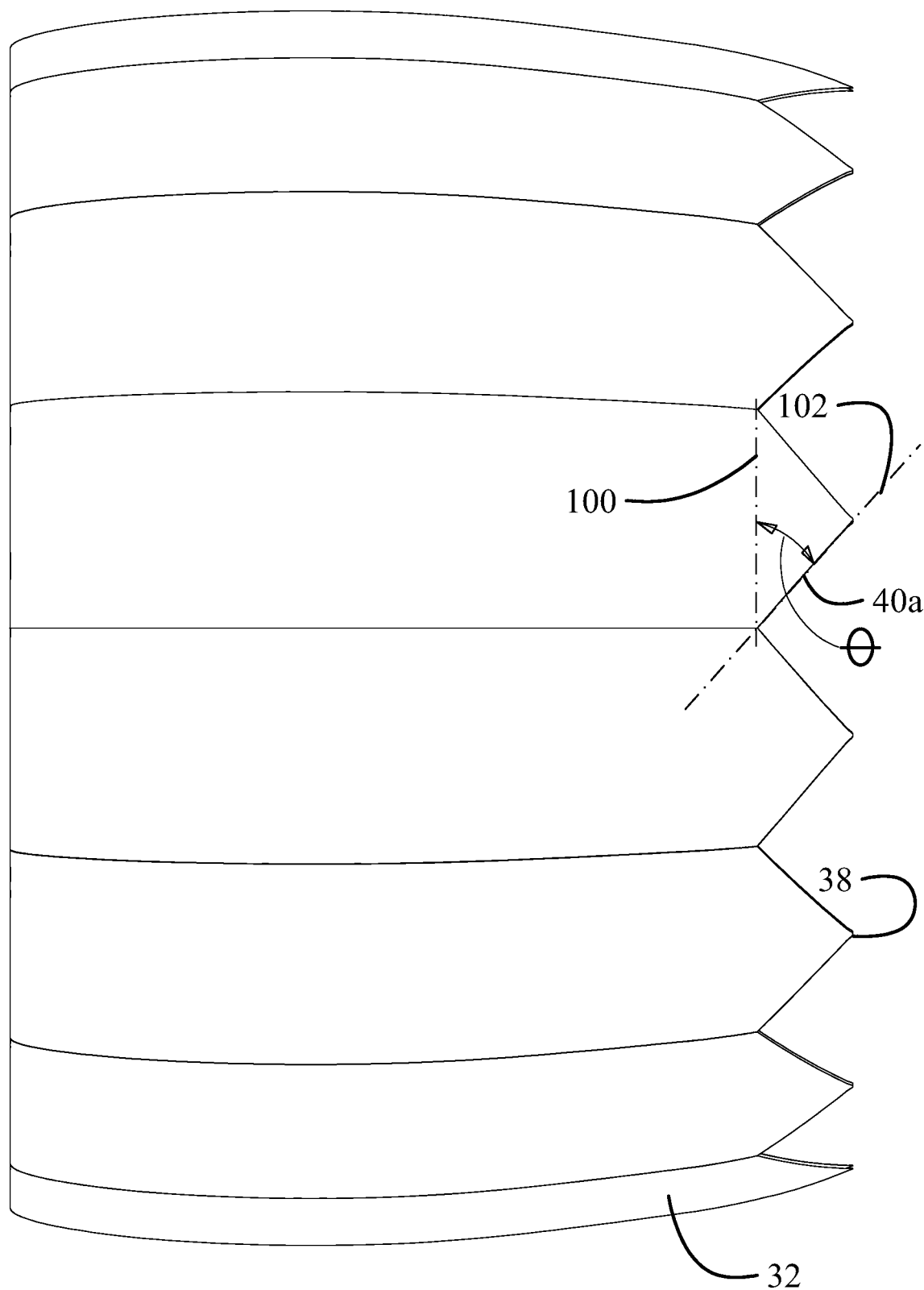
FIGS. 4A and 4B are side and rear pictorial representations of the fan cowl with an exemplary saw tooth configuration of the periodic curve in the serrated trailing edge of the fan cowl.
Figure 4B:
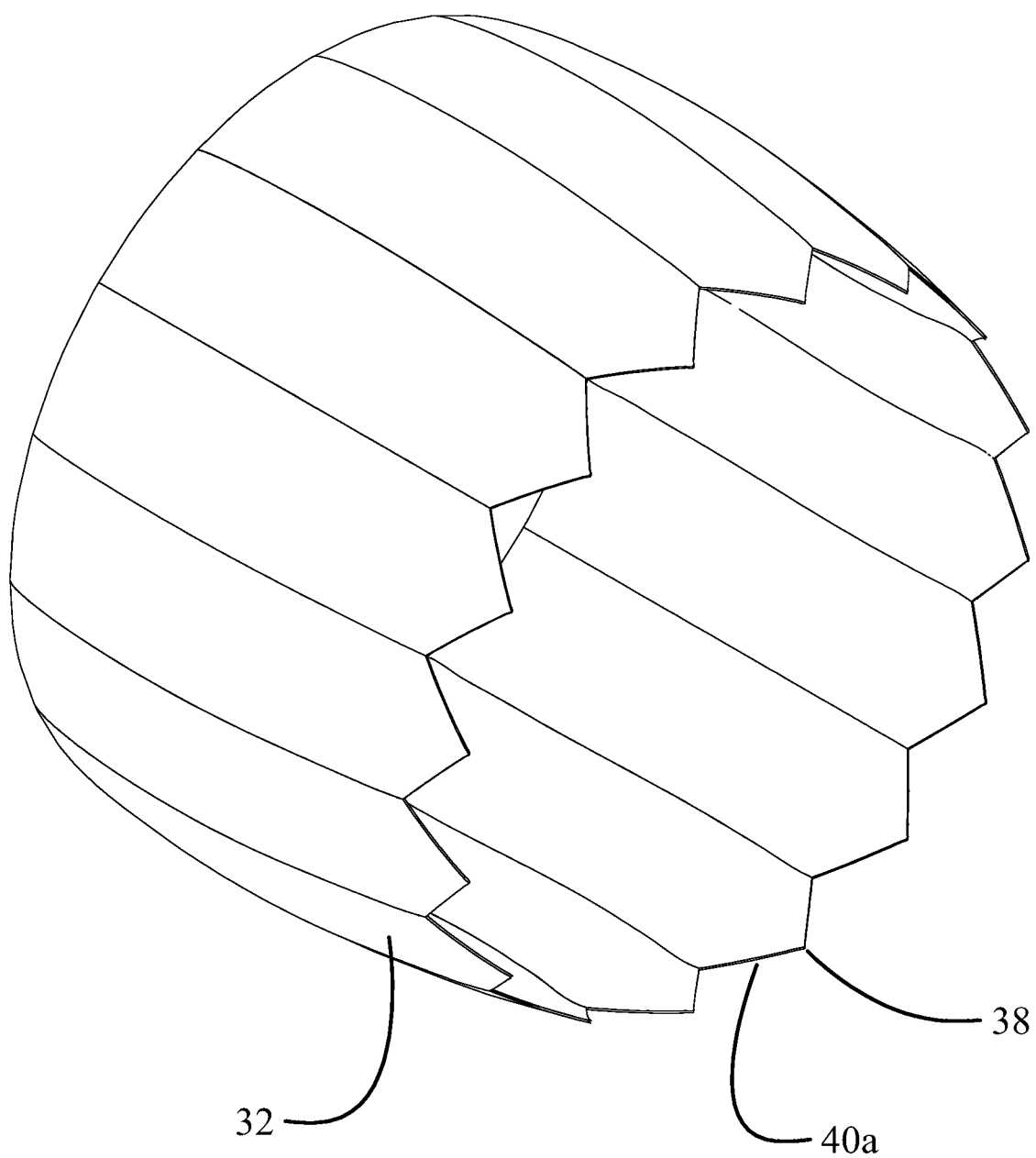
Figure 5A:
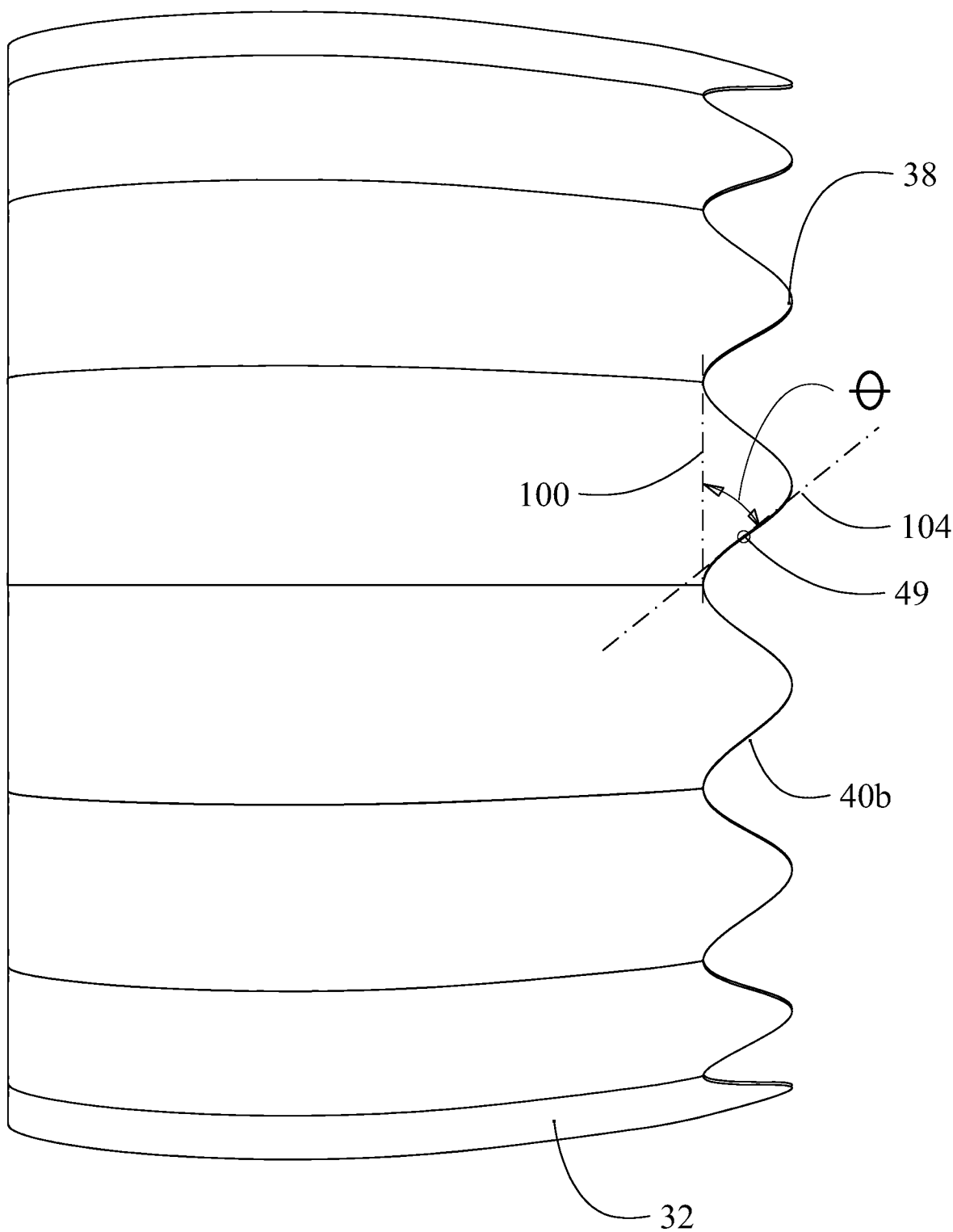
FIGS. 5A and 5B are side and rear pictorial representations of the fan cowl with an exemplary sinusoidal configuration of the periodic curve in the serrated trailing edge of the fan cowl.
Figure 5B:
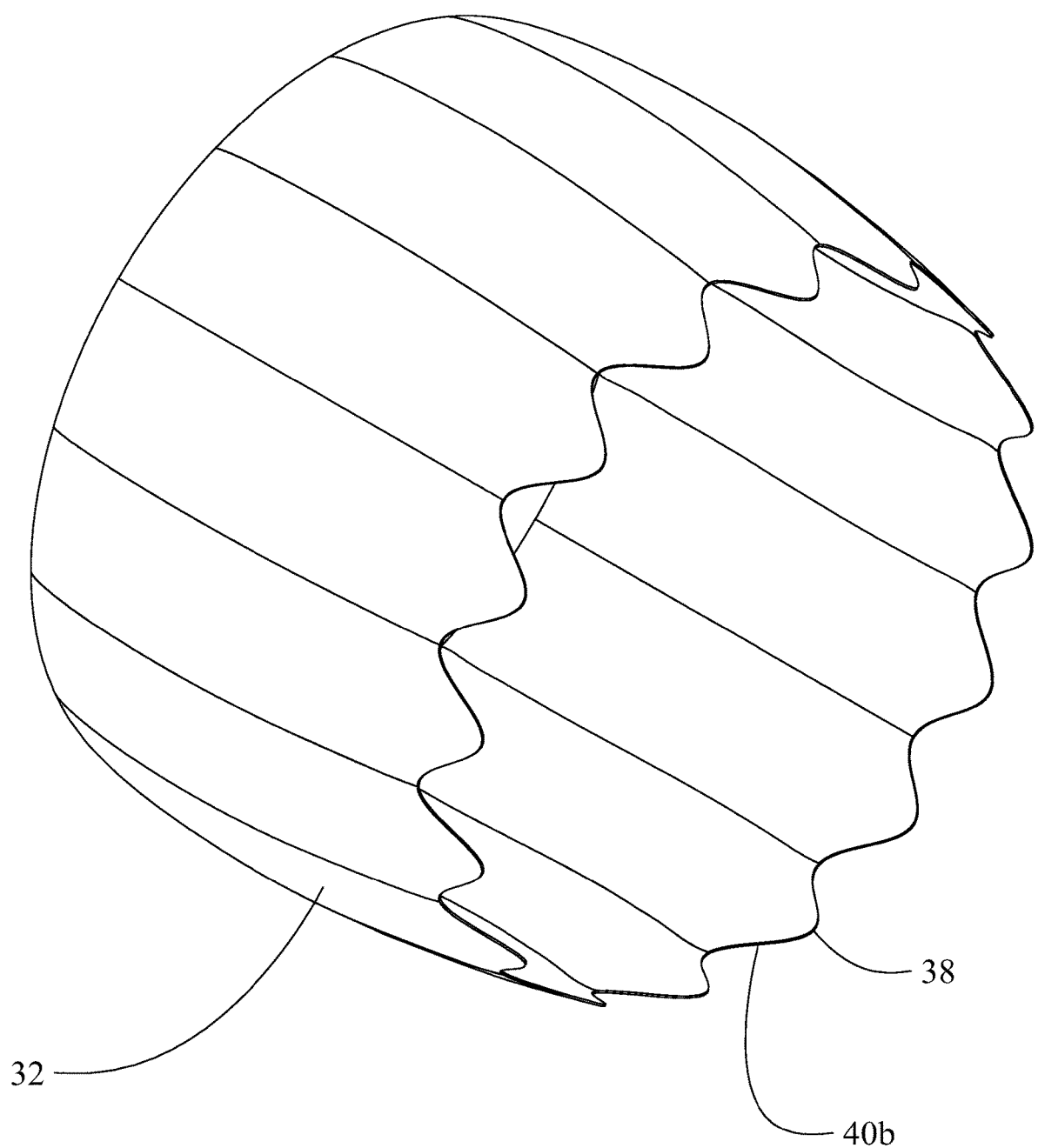
Figure 6A:
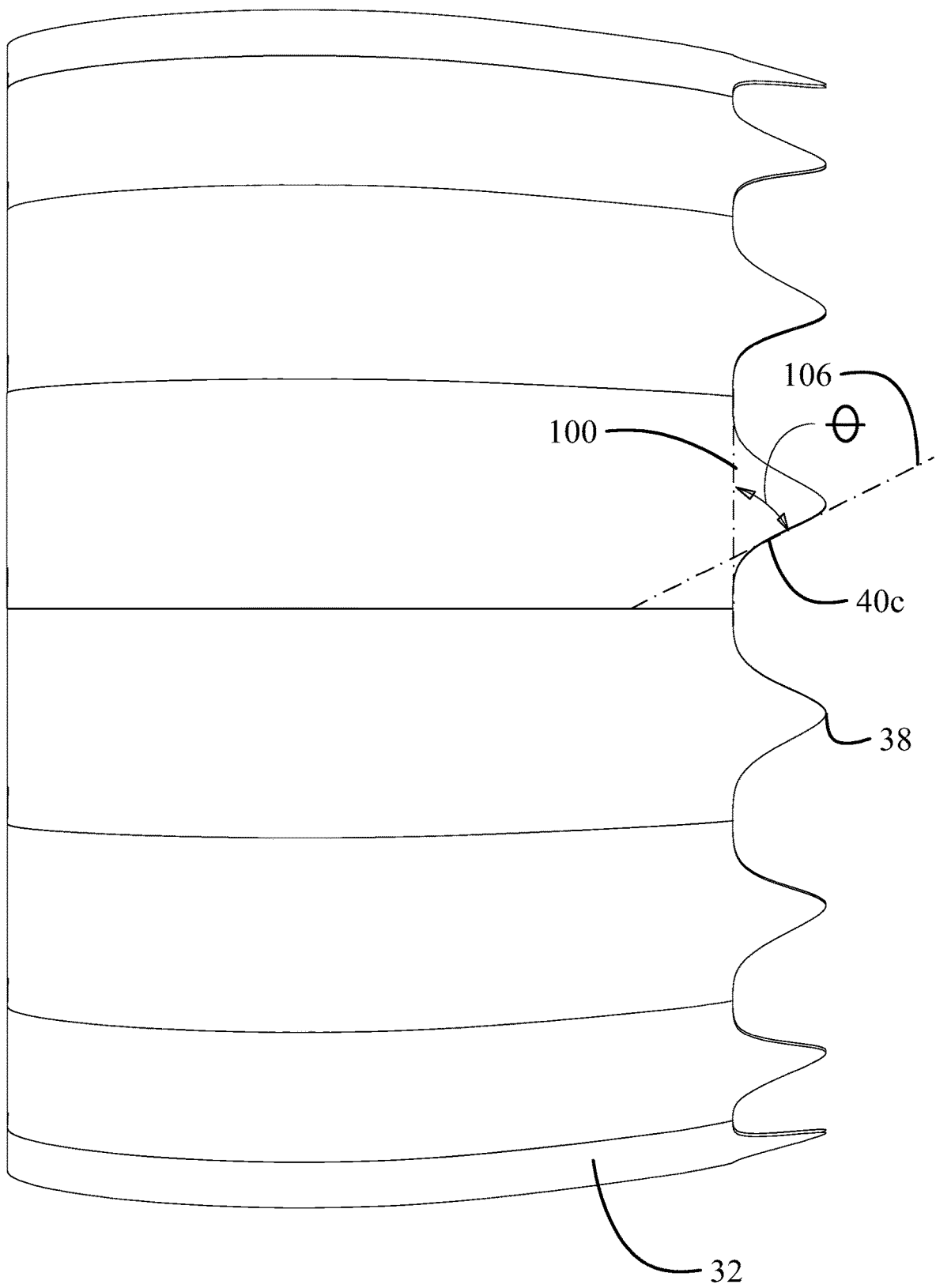
FIGS. 6A and 6B are side and rear pictorial representations of the fan cowl with an exemplary peaky sinusoidal configuration of the periodic curve in the serrated trailing edge of the fan cowl.
Figure 6B:
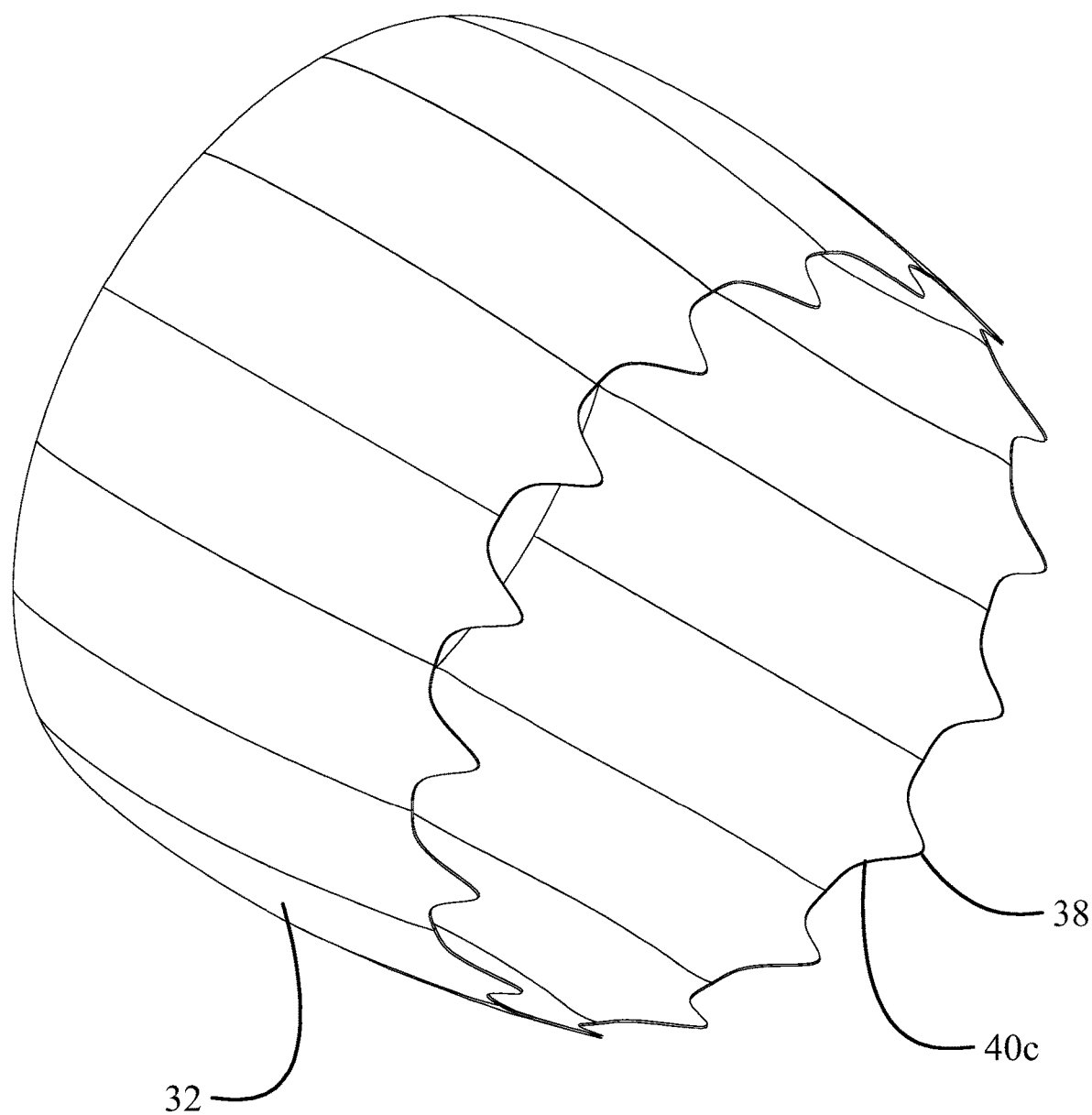
Figure 7A:
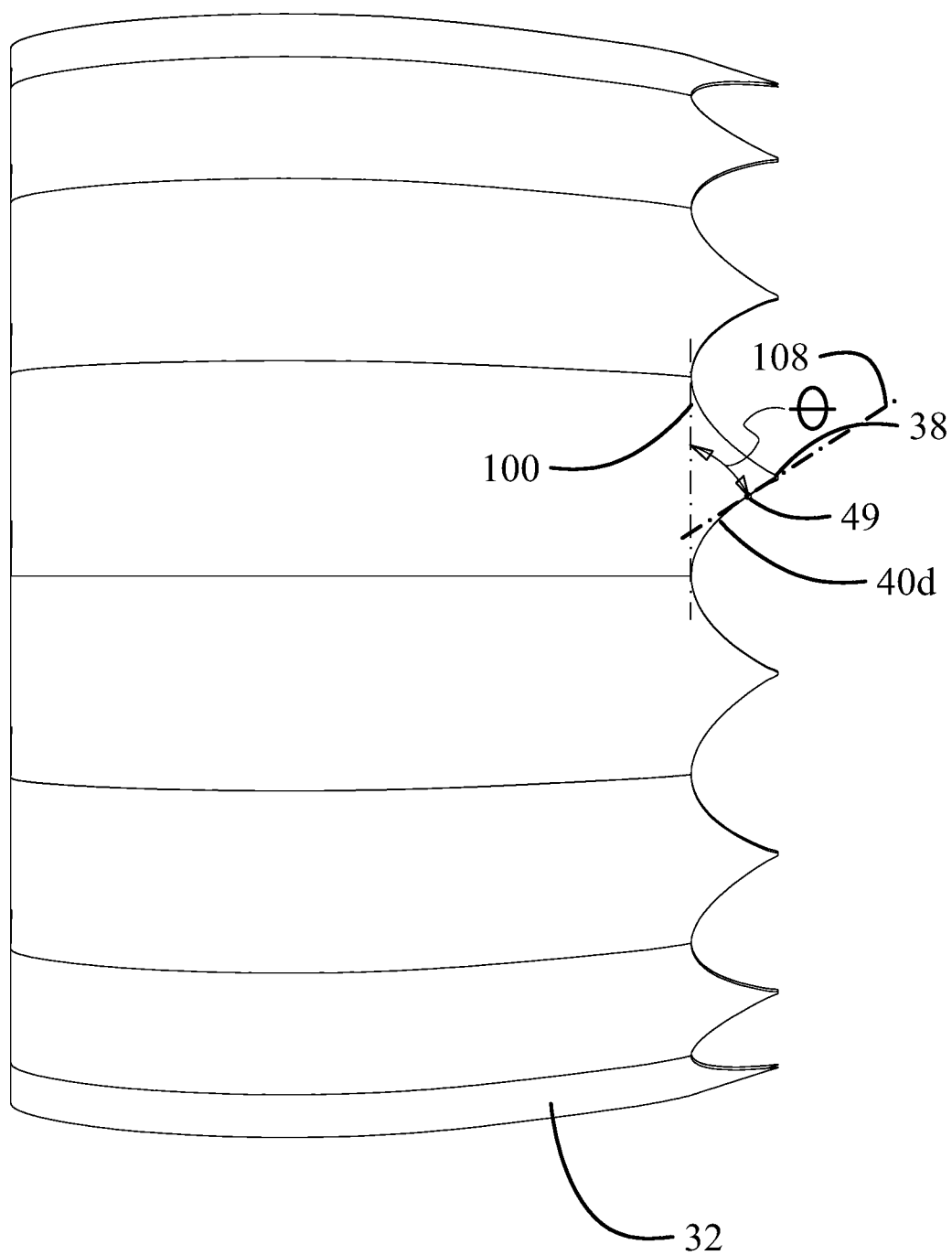
FIGS. 7A and 7B are side and rear pictorial representations of the fan cowl with an exemplary sharp parabolic configuration of the periodic curve in the serrated trailing edge of the fan cowl.
Figure 7B:
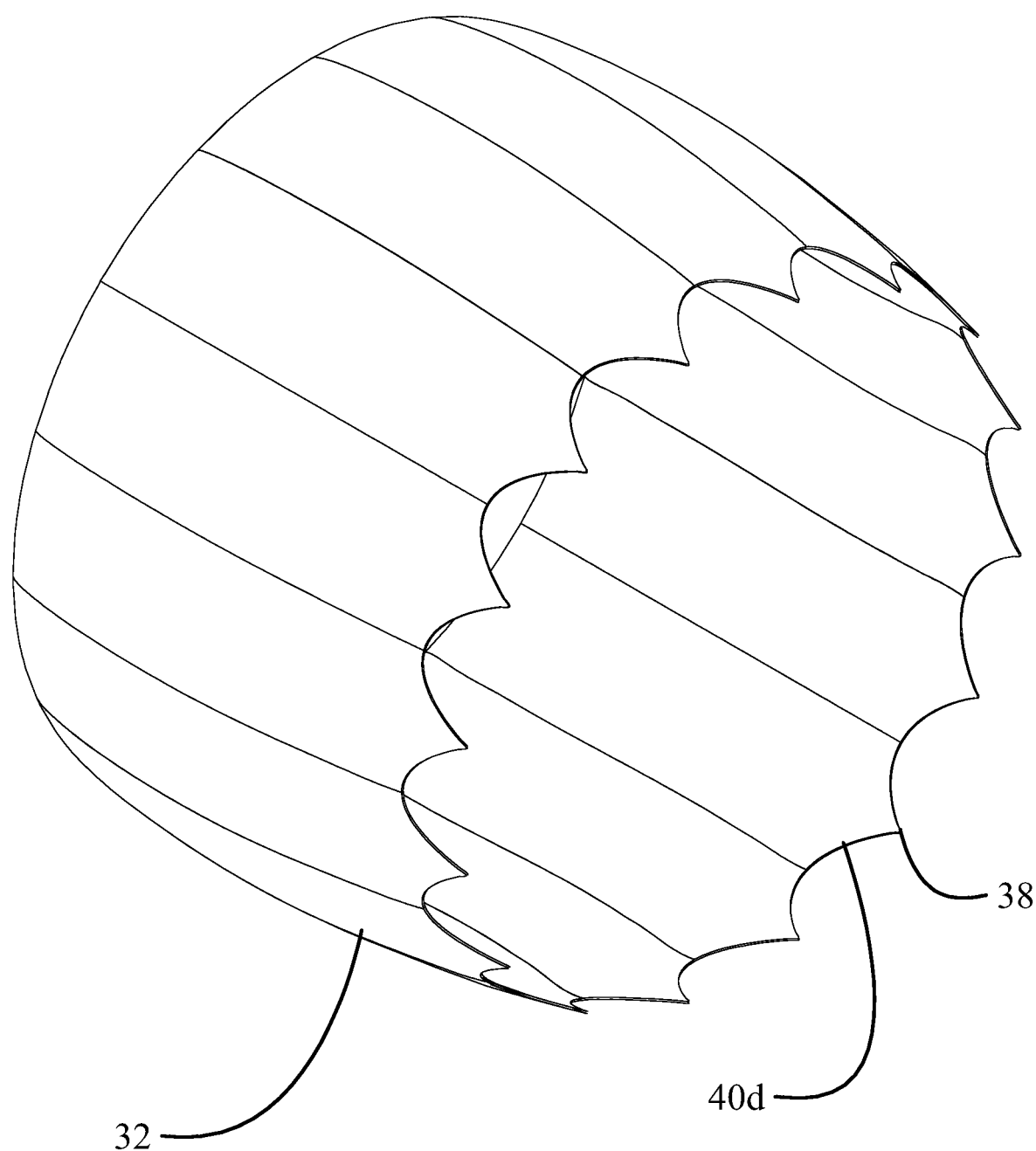

The plurality of periodic curves 40 forming the serrated trailing edge 38 on the fan cowl 32 may be generally characterized as chevron shaped and may be shaped as "saw-tooth" curves 40a (seen in FIGS. 4A and 4B), "sinusoidal" curves 40b (seen in FIGS. 5A and 5B), "peaky sinusoidal" curves 40c (seen in FIGS. 6A and 6B), or "sharp parabolic" curves 40d (seen in FIGS. 7A and 7B) to accommodate specific engine designs and aerodynamic requirements. Saw tooth curves have substantially flat sides connecting in an inner vertex at each valley and an outer vertex at each tip. The sinusoidal curves are sinusoids with a power of 1.0 while the peaky sinusoidal curves are sinusoids with a power greater than one with the example shown being a power of 2.0. Sharp parabolic curves are parabolic curves originating in each valley and terminating at each tip with a sharp vertex or small radius. For purposes of generalization, a chevron geometry is defined herein as a serration having an elliptic valley (for example with a radius R) and an elliptic tip (for example with a radius ½ R) connected by straight lines or with the valley and tip curves interconnecting at an inflection point. The maximum sweep angle, θ (Theta), (with regard to a reference line 100 through the upstream vertices of the curves) of these periodic curves, either for a straight section (as represented by reference lines 102 and 106 in FIGS. 4A and 6A) or at the inflection point 49 (as represented by reference lines 104 and 108 in FIGS. 5A and 7A), in exemplary implementations is greater than 25 degrees and is desirably at least 25-30 degrees, with a preferred value of between 45 and 60 degrees.

Figure 8:
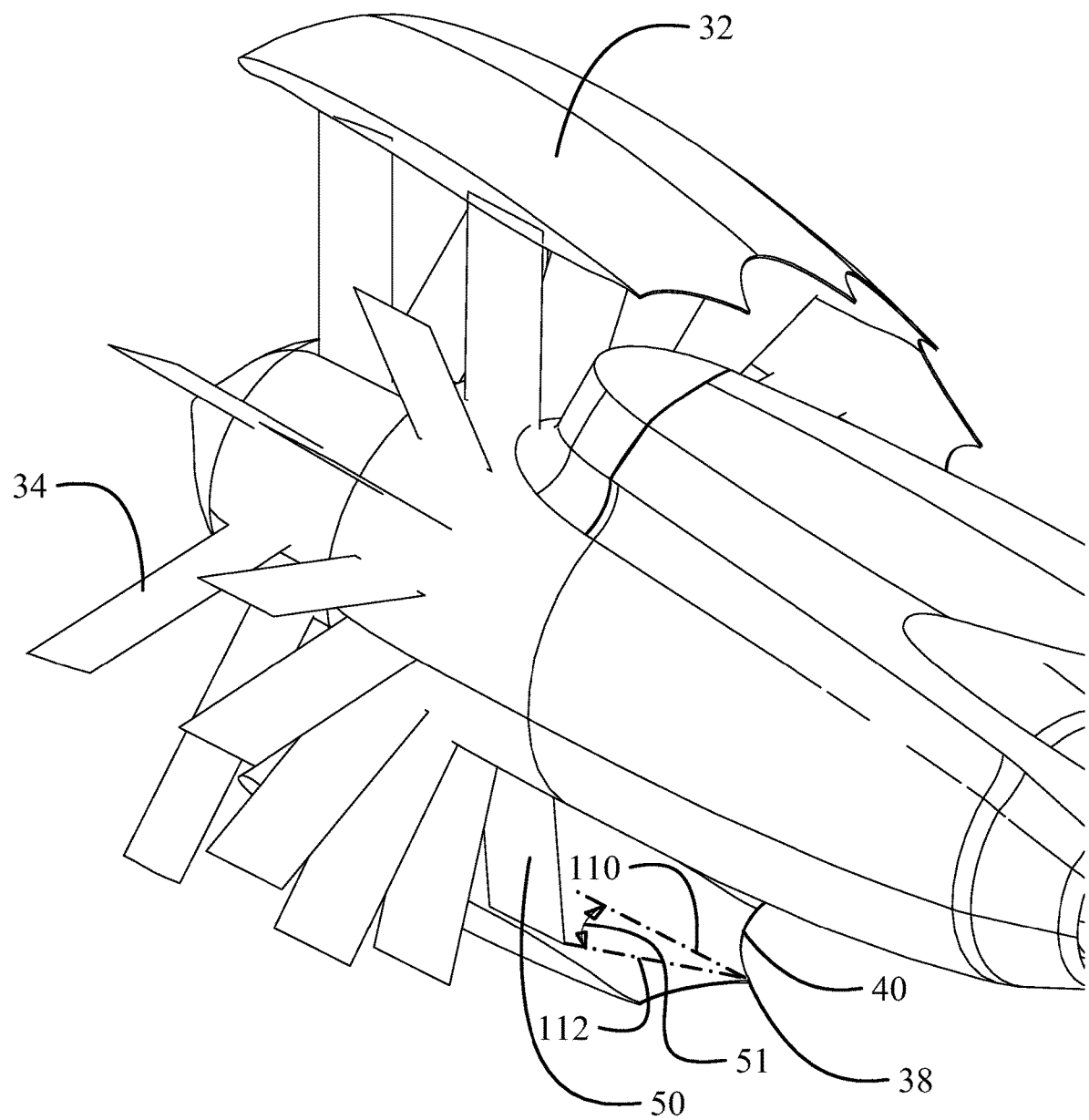
FIG. 8 is a partial section representation showing exemplary guide vanes in the fan cowl.

Engines as exemplified in the implementations described herein employ stators or guide vanes for aerodynamic control of flow exiting the VPF 34 in the fan cowl 32. The guide vanes may be a single row or multiple rows extending aft of the VPF 34 but typically terminate in a row of outer guide vanes (OGVs) 50 as represented in FIG. 8. Additional desirable flow control is achieved in the exemplary implementations by synchronizing the number and clocking of the periodic curves 40 of the serrated trailing edge 38 with the OGVs 50. For example, if the number of OGVs in the plurality of OGVs 50 is NOGV, then the number of peaks/valleys (NPV) in the plurality of curves forming the serrated trailing edge 38 should be an integer multiple of NOGV (i.e. NPV/NOGV=an integer value). With this integer relationship, the periodic curves 40 may be synchronized with the OGVs 50 by angular orientation with respect to the OGVs 50 (i.e. have clocking angle 51 between reference line 112 relative to an axis identified by line 110 through the adjacent trailing vertex of the serrated trailing edge 38) to accommodate swirl in the flow for optimized aerodynamic alignment of reverse flow entering through the OGVs 50 in RT mode.

Figure 9:
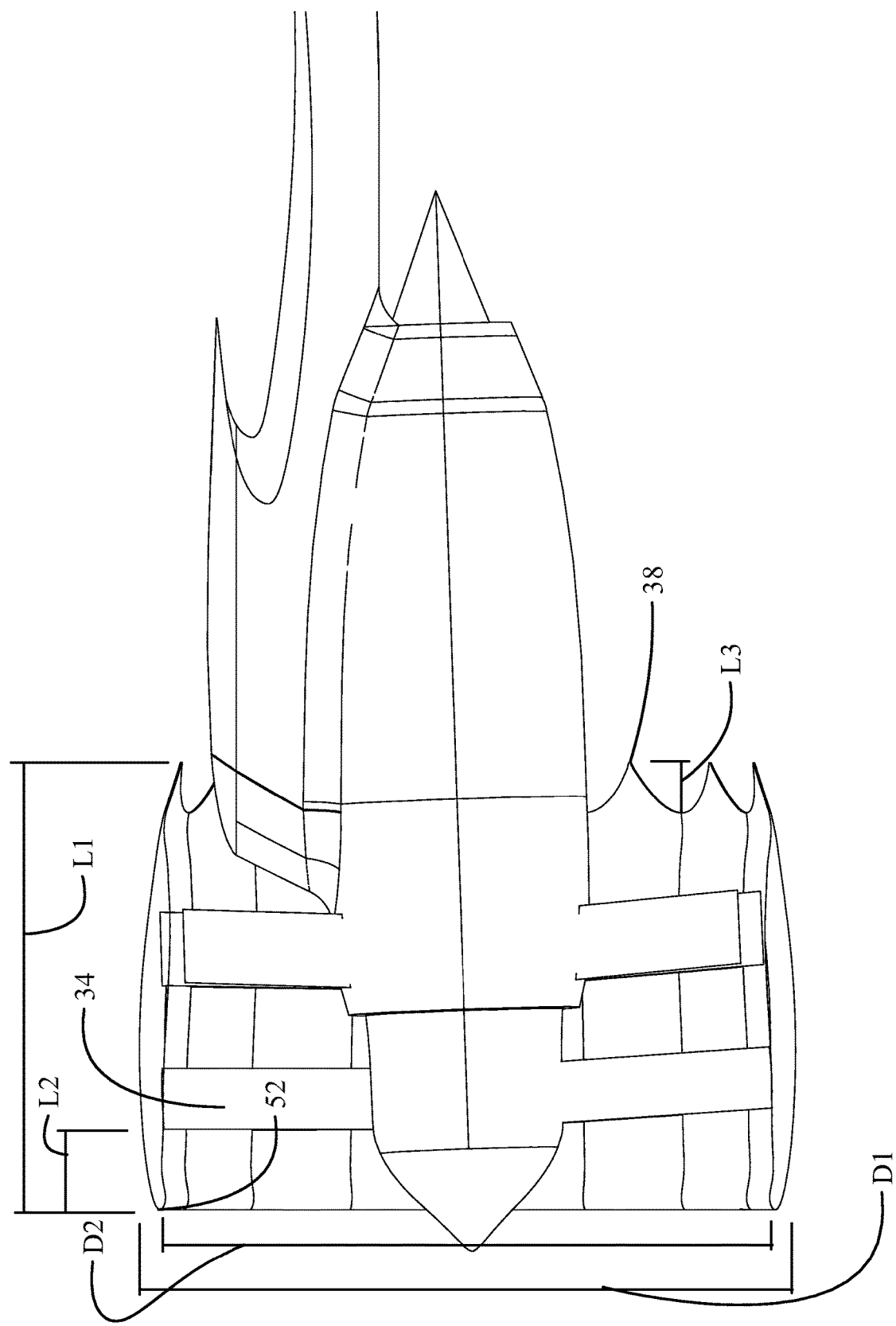
FIG. 9 is a section representation of the exemplary implementation with relative dimensions; and, FIG. 10 is a flow chart showing a method for controlling airflow for reverse thrust in an ultrashort nacelle employing the disclosed implementation.

In an exemplary implementation represented in FIG. 9 (representation not to scale), fan cowl length L1 is approximately 68-70 inches and maximum fan cowl outer diameter D1 is approximately 130-135 inches. The inlet length L2 (from an inlet lip 52 to the VPF 34) is approximately 12-20 inches with a diameter D2 of the VPF 34 approximately 120 inches. The depth L3 of the serrations is approximately 6 inches dependent on configuration, sweep angle and number of periodic curves in the circumference. Ratios of defining geometry for this implementation are L1/D1=0.5-0.6, L2/D2=0.10-0.17. Desired L1/D1 for exemplary ultrahigh bypass turbofan engines in which implementations are most desirable is less than or equal to 1.0 and L2/D2 is less than or equal to 0.25.

Figure 10:
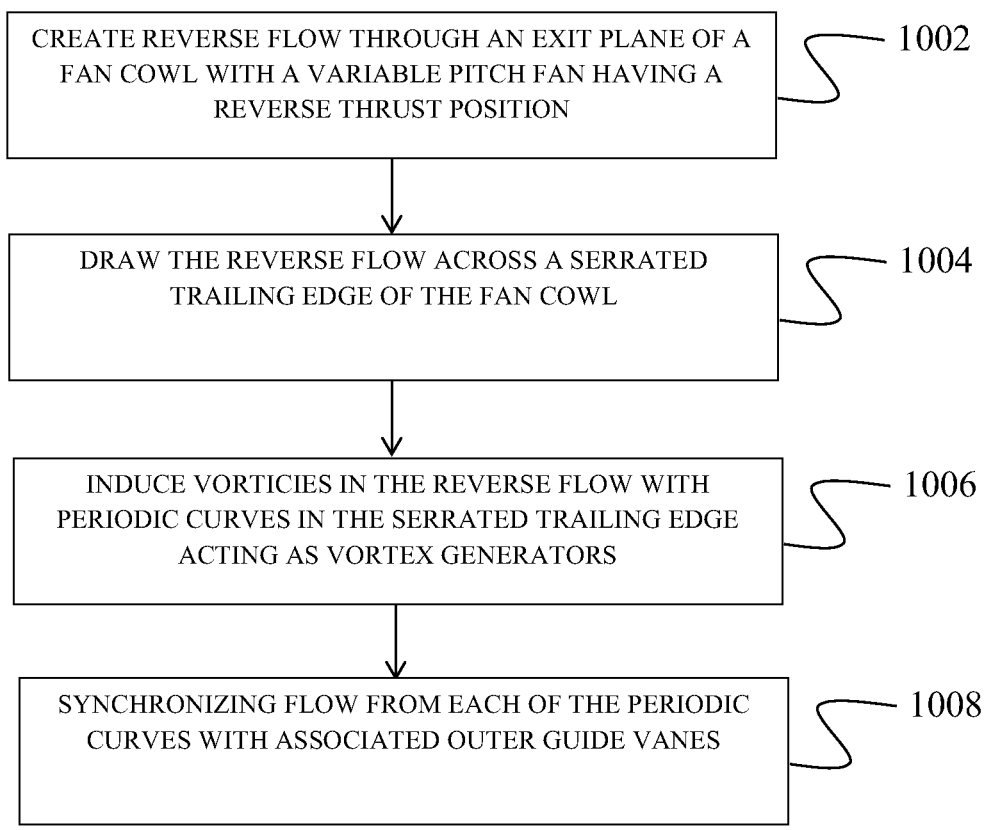

The exemplary implementations disclosed herein provide a method for controlling airflow for reverse thrust in an ultrashort nacelle as shown in FIG. 10. A reverse flow is created through an exit plane of a fan cowl with a variable pitch fan (VPF) housed within the fan cowl and having a reverse thrust position, step 1002. The reverse flow is drawn across a serrated trailing edge of the fan cowl, step 1004. A plurality of periodic curves forming the serrated trailing edge induces vortices in the reverse flow, step 1006. As previously described, the periodic curves are saw tooth, sinusoidal, peaky sinusoidal, sharp parabola or chevron geometries. The flow from each of the plurality of periodic curves is synchronized with associated outer guide vanes (OGVs) housed in the fan cowl, step 1008. Synchronization is achieved by matching the number of OGVs with integer multiples of the periodic curves and clocking of the periodic curves relative to associated OGVs for matching swirl characteristics in the reverse flow for smooth aerodynamic alignment.

Having now described various implementations of the disclosure in detail as required by the patent statutes, those skilled in the art will recognize modifications and substitutions to the specific implementations disclosed herein. Such modifications are within the scope and intent of the present disclosure as defined in the following claims.

What is claimed is:

1. A nacelle configuration comprising:
   a fan cowl having an exit plane and a serrated trailing edge; and
   a variable pitch fan (VPF) housed within the fan cowl, said VPF having a reverse thrust position inducing a reverse flow through the exit plane and into the fan cowl;
   a plurality of outer guide vanes (OGVs) housed within the fan cowl;
   wherein said serrated trailing edge comprises a plurality of vortex generators configured to induce vortices in the reverse flow at the serrated trailing edge, wherein the plurality of OGVs comprises a number of OGVs (NOGV) and a plurality of periodic curves in the serrated trailing edge comprises a number (NPV) of peaks and valleys and the NPV is an integer multiple of the NOGV and wherein a clocking angle with respect to the plurality of OGVs from a reference line relative to an axis through an adjacent trailing vertex of the serrated trailing edge of the plurality of periodic curves provides aerodynamically aligned reverse flow into the plurality of OGVs.

2. The nacelle configuration as defined in claim 1 wherein the serrated trailing edge comprises the plurality of periodic curves having at least one of a saw tooth, sinusoidal, peaky sinusoidal, sharp parabola and chevron geometry.

3. The nacelle configuration as defined in claim 2 wherein each of the plurality of periodic curves has a maximum sweep angle of greater than 25 degrees.

4. The nacelle configuration as defined in claim 3 wherein each of the plurality of periodic curves has a maximum sweep angle of at least 30 degrees.

5. The nacelle configuration as defined in claim 3 wherein each of the plurality of periodic curves has a maximum sweep angle between 25 and 60 degrees.

6. The nacelle configuration as defined in claim 1 wherein a fan cowl length is less than or equal to a diameter of the VPF.

7. The nacelle configuration as defined in claim 1 wherein the fan cowl has an inlet length from an inlet lip to the VPF and the inlet length is less than 25 percent of a diameter of the VPF.

8. An aircraft engine comprising:
a nacelle having a fan cowl and a core nacelle housing an engine core, said fan cowl having an exit plane and a serrated trailing edge; and
a variable pitch fan (VPF) housed within the fan cowl and engaged to the engine core, said VPF having a reverse thrust position inducing a reverse flow through the exit plane and into the fan cowl;
a plurality of outer guide vanes (OGVs) housed within the fan cowl;
wherein said serrated trailing edge comprises a plurality of vortex generators configured to induce vortices in the reverse flow at the serrated trailing edge, wherein the plurality of OGVs comprises a number of OGVs (NOGV) and the plurality of periodic curves in the serrated trailing edge comprises a number (NPV) of peaks and valleys and the NPV is an integer multiple of the NOGV and wherein a clocking angle with respect to the plurality of OGVs from a reference line relative to an axis through an adjacent trailing vertex of the serrated trailing edge of the plurality of periodic curves provides aerodynamically aligned reverse flow into the plurality of OGVs.

9. The aircraft engine as defined in claim 8 wherein said core nacelle is concentric to the fan cowl and extends through the exit plane.

10. The aircraft engine as defined in claim 8 wherein the serrated trailing edge comprises the plurality of periodic curves having at least one of a saw tooth, sinusoidal, peaky sinusoidal, sharp parabola and chevron geometry.

11. The aircraft engine as defined in claim 10 wherein each of the plurality of periodic curves has a maximum sweep angle of greater than 25 degrees.

12. The aircraft engine as defined in claim 11 wherein each of the plurality of periodic curves has a maximum sweep angle of at least 30 degrees.

13. The aircraft engine as defined in claim 11 wherein each of the plurality of periodic curves has a maximum sweep angle between 25 and 60 degrees.

14. The aircraft engine as defined in claim 8 wherein a fan cowl length is less than or equal to a diameter of the VPF.

15. The aircraft engine as defined in claim 8 wherein the fan cowl has an inlet length from an inlet lip to the VPF and the inlet length is less than 25 percent of a diameter of the VPF.

16. A method for controlling airflow for reverse thrust in a nacelle, the method comprising:
inducing a reverse flow through an exit plane of a fan cowl wherein a variable pitch fan (VPF) having a reverse thrust position is housed within the fan cowl;
drawing the reverse flow across a serrated trailing edge of the fan cowl; and
inducing vortices in the reverse flow with the serrated trailing edge;
aligning the reverse flow drawn across each of the plurality of periodic curves with an associated outer guide vane (OGV) of the plurality of OGVs housed in the fan cowl by establishing the plurality of periodic curves as a number (NPV) of peaks and valleys and the plurality of OGVs as a number of OGVs (NOGV) and the NPV is an integer multiple of the NOGV, wherein each of the periodic curves in the plurality of periodic curves has a clocking angle with respect to an associated OGV in the plurality of OGVs from a reference line relative to an axis through an adjacent trailing vertex of the serrated trailing edge of the plurality of periodic curves.

17. The method as defined in claim 16 wherein the plurality of periodic curves comprises at least one of a saw tooth, sinusoidal, peaky sinusoidal, sharp parabola and chevron geometry.

18. The method as defined in claim 16 wherein each of the plurality of periodic curves has a maximum sweep angle of at least 30 degrees.

19. The method as defined in claim 16 wherein each of the plurality of periodic curves has a maximum sweep angle between 25 and 60 degrees.

20. The method as defined in claim 16 wherein a fan cowl length is less than or equal to a diameter of the VPF.

21. The method as defined in claim 16 wherein the fan cowl has an inlet length from an inlet lip to the VPF and the inlet length is less than 25 percent of a diameter of the VPF.

\* \* \* \* \*